May 12, 1970     J. R. LYSAGHT ET AL     3,511,505
RISING TABLE QUESTION AND ANSWER GAME
Filed March 26, 1968     2 Sheets-Sheet 1
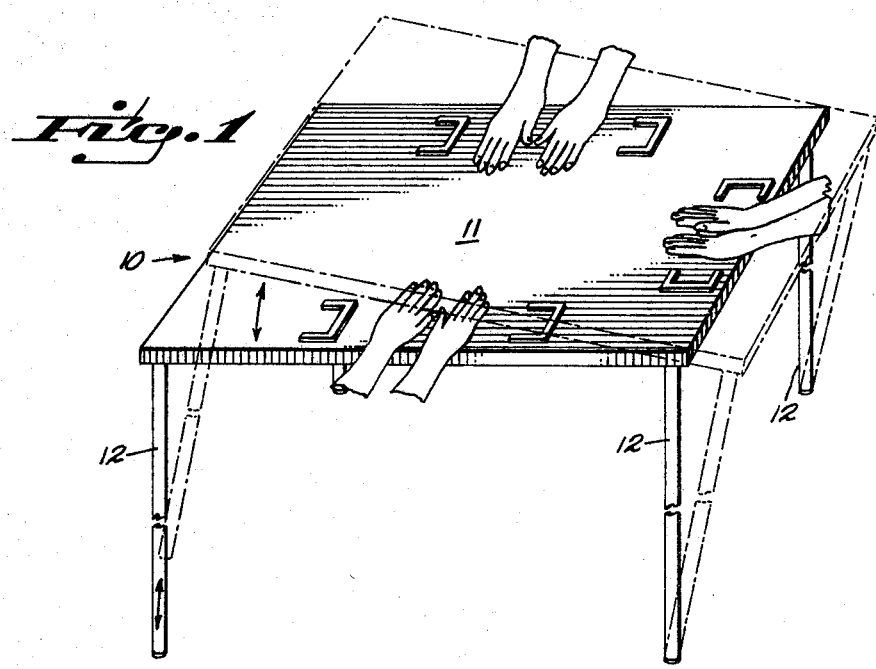
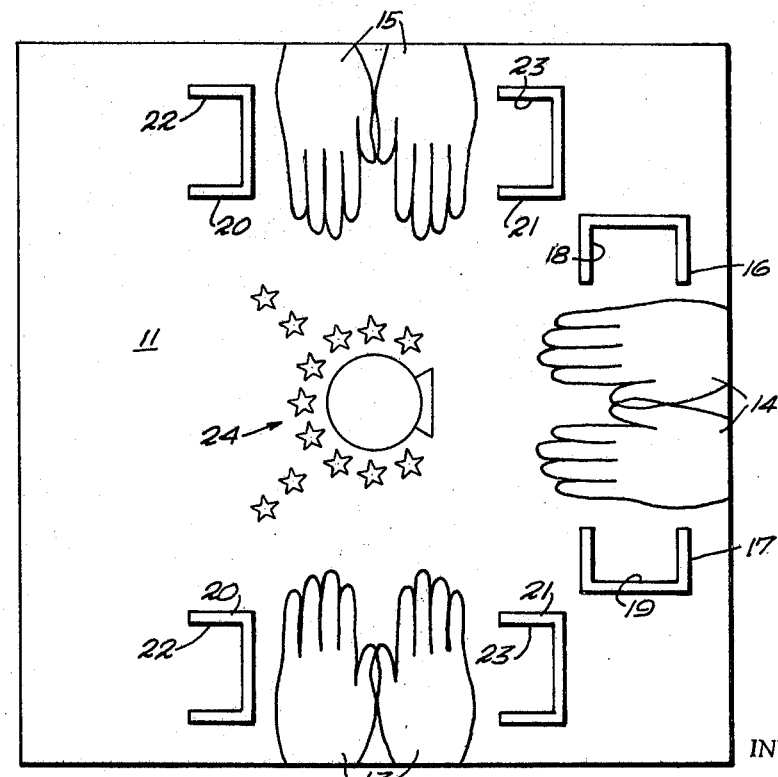
INVENTOR.
JOSEPH R. LYSAGHT
BY MYRNA LYSAGHT
Ernest A Schmidt
ATTORNEY.

May 12, 1970  J. R. LYSAGHT ET AL  3,511,505
RISING TABLE QUESTION AND ANSWER GAME
Filed March 26, 1968  2 Sheets-Sheet 2
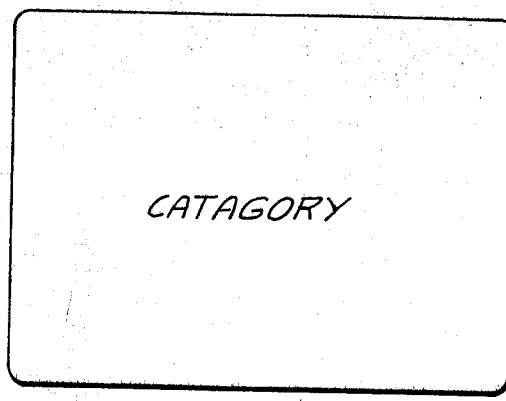
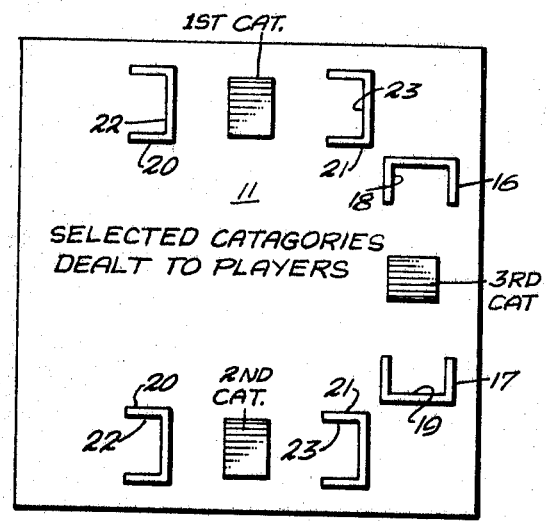
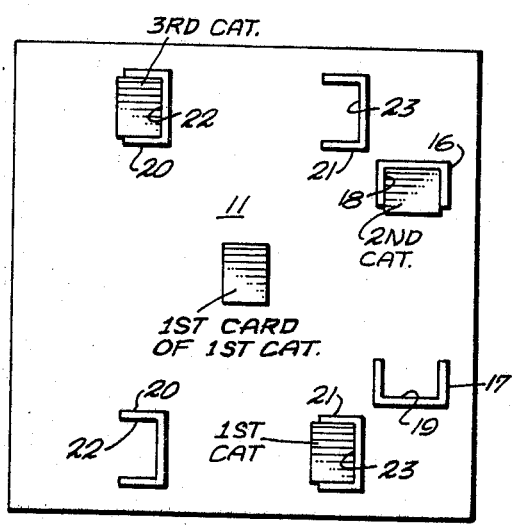
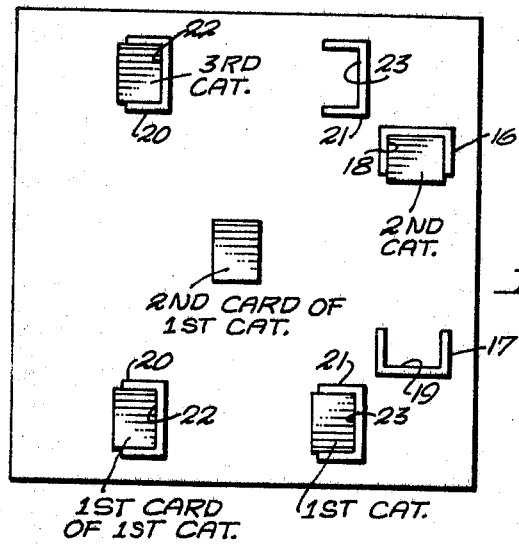
INVENTOR.
JOSEPH R. LYSAGHT
MYRNA LYSAGHT
BY
ATTORNEY.

United States Patent Office 3,511,505
Patented May 12, 1970

---

3,511,505
RISING TABLE QUESTION AND ANSWER GAME
Joseph R. Lysaght and Myrna Lysaght, Miami Lakes, Fla. (both of 5887 Monogahela Ave., Bethal Park, Pa. 15102)
Filed Mar. 26, 1968, Ser. No. 716,097
Int. Cl. A63f 9/18
U.S. Cl. 273—161                                4 Claims

ABSTRACT OF THE DISCLOSURE

A question and answer game comprising a light-weight square table about which three players sit at three sides thereof with their hands resting palms down on top the table and wherein questions are presented by the players for answer by the table. Answers are formulated so as to be answerable by number, and the table answers by rising at its fourth side and tapping on the floor a number of times corresponding to the answer number. The game comprehends the use of question and answer cards in category groups for the orderly presentation of questions by the players, and slot retaining means is provided on the table to prevent the various groups of active and discarded cards being used by the players from sliding off the table during its tapping movements.

---

This invention relates generally to games, and is directed particularly to a question and answer game wherein the answers are supplied through apparently supernatural rappings of a raised table about which the players are seated with their hands upon the table.

The principal object of the invention is to provide a mysterious question and answer game the playing of which simulates a seance, and wherein answers are given in response to questions put to the table about which the players sit and upon which they lightly place the palms of their hands. The answers are mysteriously supplied by the table through its gentle rising and falling at one side to tap the floor a particular number of times corresponding to the answer being sought, the questions being phrased in such a way as to be answered by a particular whole number.

Another object is to provide a mysterious table-rapping question and answer game of the above nature including a light-weight table having indicia thereon pictorially indicating the placement positions of the hands of the players in playing the game, and including slot means for holding the active and discarded question and answer cards, the slot means being so designed as to prevent the falling away of the cards during the tapping or rising and falling movements of the table.

Still another object is to provide a question and answer game of the above nature which will be highly entertaining to both children and adults alike and which at the same time will be educational.

Yet another object is to provide a game of the above nature which will be simple in structure, attractive in appearance, inexpensive to manufacture and durable in use.

Other objects, features and advantages of the invention will be apparent from the following description when read with reference to the accompanying drawings.

In the drawings, wherein like reference numerals denote corresponding parts throughout the several views:

FIG. 1 is a perspective view of the table embodying the invention illustrating its tipping motion in rapping on the floor during playing of the game;

FIG. 2 is a top view of the table;

FIGS. 3 and 4 illustrate the back and face sides, respectively, of a typical question and answer card; and FIGS. 5, 6 and 7 illustrate, sequentially, the manner in which the game is played with the use of category question and answer cards.

Referring now in detail to the drawings, the numeral 10 designates, generally, a rising table embodying the invention, same being comprised of a table top 11 approximately 29 inches square having four light-weight corner legs 12 each about 31 inches long. The table top 11 is preferably fabricated either of thin plywood or integrally molded of a stiff synthetic plastic material. The corner legs 12 may be in the form of wooden or molded synthetic plastic spindles and are preferably removably attached to the underside of the table by screw means or the like. Alternatively, the corner legs can be collapsably linked to the table top, such as is commonplace in ordinary foldable card tables, the object being to enable compact shipment or storage when the table is not in use. As illustrated in FIGS. 1 and 2, the game is designed for playing by three players sitting at three sides of the table, the fourth side being vacant to permit rising and falling thereof during the playing of the game as hereinafter described, the rising motion of said table being illustrated by the broken line representation thereof in FIG. 1.

In playing the game the three players will place their hands palms down on that part of the table directly in front of them. As illustrated in FIG. 2 the table top 11 is imprinted or otherwise marked with pictorial representations of pairs of hands designated by reference numerals 13, 14 and 15, indicating the locations of placement of the hands of the players in playing the game. The table top 11 is also provided with holding slot means for the reception of active and discarded question and answer category cards used in playing the game. To this end, there is provided a pair of opposed, U-shaped rails 16, 17 at each side of the hand designations 14 defining facing slots 18, 19 for use by the player at the front of the table. The left and right sides of the table are each provided with a pair of U-shaped rails 20, 21 at each side of their respective hand designations 13, 15, defining rearwardly open rectangular slots 22, 23 for the reception of cards by the players at the side positions of the table. The slot defining rails 16, 17, 20 and 21 may, for example, be in the form of wooden strips glued or otherwise secured to the table top if fabricated of wood, or, if the table top is molded synthetic plastic construction, said rails will preferably be integrally molded therein. The table top 11, as illustrated in FIG. 2, will also preferably be printed or otherwise impressed with mystic symbols, such as the crystal ball and stars indicated at 24, to enhance the spiritualistic aspects of the game.

PLAYING THE GAME

The three players sit at the table at the places indicated by the hand prints, leaving the back end of the table open or vacant. Each player will then rub the palms of his hands together vigorously for a few seconds, after which he will place them face down lightly on the designated hand prints. The players will then concentrate on the following commands which they will then give to the table: "RISE, MAGIC TABLE, RISE"; "HIGHER, MAGIC TABLE, HIGHER"; "HURRY, MAGIC TABLE, HURRY." The players will continue concentrating and repeating these phrases until the table is off the floor at the rear end by approximately 6 to 8 inches. When this is achieved, the players will tell the table, "STOP." At this point, with one side of the table off the floor, the players will be ready to start asking questions. While continuing their concentration on the game the players will, one at a time, ask questions that can be answered by a number of raps. For example, one player might ask, "MAGIC TABLE, WILL I GET A RAISE IN PAY? TAP ONE FOR YES, TWICE FOR NO AND THEN RISE BACK UP." Another question might be, "MAGIC TABLE, HOW MANY CHILDREN DO I HAVE? TAP ONCE FOR EACH CHILD, THEN RISE BACK UP." After each such question asked by the players the table, without conscious awareness on the part of the players, will move up and down, tapping on the floor a number of times corresponding to the table's answer. While it is not represented herein that the table in thus giving answers is exhibiting supernatural powers and is acting entirely independently of physical connection with the players, it has been found that the players, for the most part, will not be aware of any conscious effort on their part in influencing table movement. In this respect the game exhibits a mysterious and magical behaviour that will be found to be highly entertaining to young and old alike.

In another, more formal version of the rising table game, a plurality of category groups of question and answer cards is used, presenting for answer questions in various categories such as geography, history, sports, current events, etc. Thus, as illustrated in FIGS. 3 and 4, cards 25 are provided the back of each of which (see FIG. 3), is designated with a particular question category and the face of which with a particular question of that category, the question preferably being in the form of a multiple choice question wherein the correct answer corresponds to a number for the table to rap. The correct answer will also be given on the question cards.

In playing the game with category cards the three players will first select their category and a predetermined number of cards of their particular category will be dealt to them (see FIG. 5). Each player will then pass his group of category cards to the player at his right, who will then pass his group of category cards to the player at his right, who will ask the questions set forth on the cards as hereinafter described. As illustrated in FIG. 6 the category card group thus transferred will be placed in the respective players "active" slots 23, 18 and 22. The player holding the first category group will then pick up the first card at the top of the category pile and ask the question thereon of the player who selected that category group. Whether or not the player correctly answers the question, the same question will then be asked of the table, after which the card will be placed face down at the center of the table over the crystal ball (see FIGS. 1 and 6). The players will then all place their hands palms down on the table, concentrate on the question and command the table to rise and give the answer by tapping the floor as described above. While it occasionally happens that the table will not give the correct answer, it will, surprisingly, give the correct answer most of the time. The correct answer as given on the card will then be observed and the player answering will be scored accordingly. If the player questioned has answered the question correctly (regardless of the table's answer), the card will be placed face down in the discard slot 22 (see FIG. 7). If answered incorrectly, it will be placed face up in the discard slot. In this manner the score will be kept, the player to the left of the player having the most cards face down in his discard slot being declared the winner. The game can be played either by asking all questions in one category group before proceeding to the next group, or by successively proceeding around the table asking the various category group questions one at a time until all questions have been asked and answered.

While we have illustrated and described herein only one form in which the invention can conveniently be embodied in practice, it is to be understood that this form is given by way of example only and not in a limiting sense. For example, while the table has been described as being of such height as to enable the players to play the game while sitting directly around the table, it is to be understood that it could as well be made in a substantially smaller version that could rest with its legs upon the top of an ordinary table, the magic table top being just of sufficient size to permit placement of the hands thereupon in playing the game as described above. The invention, in brief, comprises all the modifications and embodiments coming within the scope and spirit of the following claims.

What we claim as new and desire to secure by Letters Patent is:

1. A rising table game comprising a light-weight, rectangular table top member, a corner leg extending downwardly from each corner of said table top, and retaining means on the top surface of said table top member adjacent to three sides thereof for reception of cards, said retaining means being operative to prevent sliding displacement of cards placed therein upon the raising of the fourth side of said table top member, said retaining means comprising a pair of slot members for each of said three sides said slot members each comprising abutment means operative to prevent sliding therepast of cards placed flat upon said table and with edges thereof in abutment with said abutment means upon said raising of said table top member, each of the pairs of said slot members being spaced apart by a distance sufficient to permit the placement of the palms of the hands therebetween.

2. A rising table game as defined in claim 1 wherein there is impressed between each pair of U-shaped rails the pictorial representation of a pair of human hands serving as positional indications for the placement of the player's hands in playing the game.

3. A rising table game as defined in claim 1 including a plurality of question and answer cards, said question and answer cards being divided into a plurality of groups of subject matter category cards.

4. A rising table game comprising a light-weight, rectangular table top member, a corner leg extending downwardly from each corner of said table top, and retaining means on the top surface of said table top member adjacent to three sides thereof for reception of cards, said retaining means being operative to prevent sliding displacement of cards placed therein upon the raising of the fourth side of said table top member, said retaining means comprising a pair of slot members for each of said three sides, each of said retaining means comprising a U-shaped rail affixed to said table top member, each of the pairs of said U-shaped rails being spaced apart by a distance sufficient to permit the placement of the palms of the hands therebetween, the pictorial representation of a pair of human hands being impressed between each pair of U-shaped rails and serving as positional indications for the placement of the player's hands in playing the game, said pairs of U-shaped rails of the two opposite sides of the said table top being disposed with their open ends facing the fourth side of said table top, said U-shaped rails of the side of said table top opposite said fourth side being disposed with their open ends facing each other.

References Cited

UNITED STATES PATENTS

| 2,394,866 | 2/1946 | McClune | 273—150 X |
| 3,023,007 | 2/1962 | Lowrey | 273—161 |
| 3,154,863 | 11/1964 | La Prelle | 273—152 X |

ANTON O. OECHSLE, Primary Examiner